(12) United States Patent
Seth et al.

(10) Patent No.: US 7,303,805 B2
(45) Date of Patent: Dec. 4, 2007

(54) LOOP FABRIC

(75) Inventors: Jayshree Seth, Woodbury, MN (US); Dennis L. Becker, Vadnais Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 230 days.

(21) Appl. No.: 10/744,265

(22) Filed: Dec. 22, 2003

(65) Prior Publication Data

US 2005/0136213 A1 Jun. 23, 2005

(51) Int. Cl.
  *B32B 5/00* (2006.01)
  *B32B 3/06* (2006.01)
  *B32B 3/28* (2006.01)
  *B32B 27/12* (2006.01)
  *B29C 47/00* (2006.01)
  *D05C 15/00* (2006.01)

(52) U.S. Cl. .................. 428/99; 428/167; 428/172; 428/195.1; 428/196; 442/394; 156/72; 156/178; 156/201; 156/244.24; 156/308.4

(58) Field of Classification Search .................. 428/99, 428/167, 172, 175, 176, 179, 181, 182, 195.1, 428/196; 442/394
See application file for complete search history.

(56) References Cited

U.S. PATENT DOCUMENTS

| 5,032,122 | A | 7/1991 | Noel et al. |
| 5,256,231 | A | 10/1993 | Gorman et al. |
| 5,547,531 | A | 8/1996 | Allen et al. |
| 5,595,567 | A | 1/1997 | King et al. |
| 5,611,791 | A | 3/1997 | Gorman et al. |
| 5,614,281 | A | 3/1997 | Jackson et al. |
| 5,615,460 | A | 4/1997 | Weirich et al. |
| 5,616,391 | A | 4/1997 | Amesz et al. |
| 5,643,397 | A | 7/1997 | Gorman et al. |
| 5,814,178 | A * | 9/1998 | Jacobs ........................ 156/290 |
| 5,858,515 | A | 1/1999 | Stokes et al. |
| 5,865,926 | A | 2/1999 | Wu et al. |
| 6,066,369 | A | 5/2000 | Schulz et al. |
| 6,217,693 | B1 | 4/2001 | Pelham |
| 2001/0031954 | A1 | 10/2001 | Jordan et al. |
| 2002/0150610 | A1* | 10/2002 | Kono et al. .................. 424/443 |
| 2002/0160143 | A1 | 10/2002 | Shepard et al. |

FOREIGN PATENT DOCUMENTS

| EP | 0 341 993 B1 | 8/1993 |
| EP | 1 164 007 A1 | 12/2001 |
| WO | WO 02/34512 A1 | 5/2002 |
| WO | WO 02/100207 A2 | 12/2002 |

* cited by examiner

*Primary Examiner*—Jenna Befumo
(74) *Attorney, Agent, or Firm*—William J. Bond

(57) ABSTRACT

This invention relates to a low cost loop material for a hook and loop fastener having at least one sheet of flexible nonwoven material intermittently bonded to inelastic oriented film. The invention further relates to methods for producing these loops.

25 Claims, 2 Drawing Sheets

LOOP FABRIC

BACKGROUND AND SUMMARY

The present invention relates to a low cost loop material for a hook and loop fastener having at least one sheet of flexible nonwoven material intermittently bonded to inelastic oriented film. The invention further relates to methods for producing these loops.

Loop fabrics formed by lamination of nonwovens to film are known from, for example, U.S. Pat. No. 5,032,122 which is formed by providing a backing of orientable material in its dimensionally unstable state; positioning a plurality of filaments on the backing; securing the filaments to the backing at spaced, fixed regions along each of the filaments, the fixed regions defining between each pair an unsecured catching region; and causing the orientable material to be transformed along its path of response to its dimensionally stable state thereby shirring the filaments at the catching regions to form fibrous elements projecting from the backing between the fixed regions. U.S. Pat. No. 5,547,531 describes forming a loop fabric by a method comprising the steps of providing a first lamina comprising an elastomeric, pressure-sensitive adhesive film having a first adhesive surface and a second adhesive surface opposed to said first adhesive surface; a relaxed orientation and an elongated orientation; stretching said first lamina from said relaxed orientation to said elongated orientation; contacting a second lamina comprising a nonwoven web with said first surface of said first lamina in said elongated orientation, thereby directly joining said second lamina and said first lamina to form a laminate; and relaxing said first lamina such that said second lamina is shirred to form catching regions capable of entangling the hooks of a complementary male fastening component. U.S. Pat. No. 5,595,567 also uses a nonwoven web which is preferably joined with a backing while the backing is in its elongated unstable orientation. Construction bonds form a bond pattern joining the nonwoven web to the backing. When the backing is contracted from its elongated orientation to its relaxed orientation, the unsecured regions of the nonwoven web become shirred and extend outwardly from the backing to form catching regions that are capable of entangling the engaging elements of a complementary male fastening component. U.S. Pat. No. 5,256,231 describes a method of providing a sheet of loop material adapted to be cut into pieces to form loop portions for fasteners of the type comprising releaseably engageable hook and loop portions and incorporated into items such as disposable garments or diapers. The sheet of loop material includes a sheet of longitudinally oriented fibers having anchor portions and arcuate portions projecting in one direction away from the anchor portions, and a layer of thermoplastic backing material extruded onto the anchor portions to bond to the anchor portions forming at least a portion of a backing for the loop material.

All these methods of forming loops stress the importance of the loop fibers to project outwardly from a backing or base layer. This increases the availability of the fibers to engage suitable hook elements. However, the backings are generally specialized and costly, dimensionally unstable, or thick. It is desired to provide a loop material having projecting loop fibers on a backing that is thin, high strength (dimensionally stable) low cost and easy to manufacture.

BRIEF DESCRIPTION

The present invention provides improved inelastic, dimensionally stable, high strength loop composite comprising an oriented inelastic film extending in at least a first direction and one or more sheets of flexible nonwoven material intermittently bonded along at least one surface portion of the oriented inelastic film. Preferably, the loop has regularly spaced bond portions between the nonwoven material and the oriented film. These intermittent bond anchor portions are separated by unbonded portions where the film and nonwoven material face each other, but are not bonded. These loop composites provide unique advantages as a low cost, flexible or soft, dimensionally stable, high performing loop which is relatively simple to manufacture.

According to the present invention there is also provided a method for forming a loop fabric sheet which comprises (1) providing a first sheet of flexible nonwoven material (e.g., nonwoven web of natural and/or polymeric fibers, and/or yams); (2) forming the first sheet of flexible nonwoven material to have arcuate portions projecting in the same direction from spaced anchor portions of the first sheet of flexible nonwoven material; (3) extruding a sheet of thermoplastic material that is inelastic (e.g., polyesters, polyolefins, nylons, polystyrenes) onto the first sheet of flexible loop material; (4) providing the film thermoplastic while still molten to at least the spaced anchor portions of the first sheet of flexible nonwoven material to bond the extruded thermoplastic film sheet to the nonwoven material at bond sites or the anchor portions; and (5) orienting the extrusion bonded nonwoven fabric sheet composite in at least the longitudinal direction of the sheet thereby orienting the sheet and reducing the height of arcuate portions of the nonwoven. By this method there is provided a novel sheet-like nonwoven loop composite comprising a flexible nonwoven intermittently bonded to a thin, high strength oriented film.

BRIEF DESCRIPTION OF THE DRAWINGS

The present invention is further described in reference to accompanying drawings, where like reference numerals refer to like parts on several views, and wherein.

DETAILED DESCRIPTION

Figure 1:
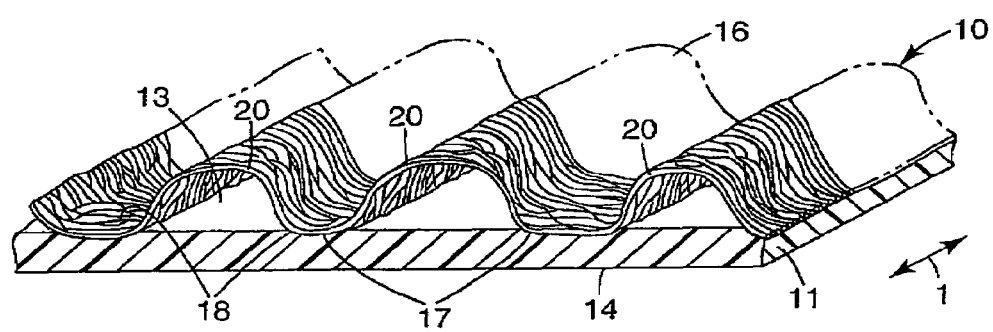
FIG. 1 is a perspective view of a first embodiment of precursor loop material prepared according to the present invention.

The invention composite loop fabric is preferably formed by extruding inelastic film onto anchor portions of a first sheet of flexible nonwoven material formed to have arcuate portions extending from the anchor portions followed by orientation to provide a strengthened loop composite. The molten film encapsulates the fibers of the anchor portions creating bond sites. The molten film can form bond sites along all or a part of the film length where there are anchor portions, (e.g., a flat portion of the nonwoven material). The solidified inelastic film has a generally uniform morphology along its length including at the bond sites. The film can be pressed against the anchor portions at the bond sites increasing the bond strength between the nonwoven sheet and the film.

A method for forming a nonwoven loop fabric with arcuate nonwoven structures between spaced apart bond sites comprises a step of forming an arcuate nonwoven precursor material, which can comprise the following steps. There is provided first and second generally cylindrical corrugating members each having an axis and including a multiplicity of spaced ridges defining the periphery of the corrugating members. The ridges have outer surfaces and define spaces between the ridges adapted to receive portions of ridges of the other corrugating member in meshing relationship with the sheet of flexible material therebetween. The ridges can be in the form of radial or longitudinally spaced parallel ridges or can be intersecting defining regular or irregular shapes with the ridges being linear, curved, continuous or intermittent. The corrugating members are mounted in axially parallel relationship with portions of the opposing ridges in meshing relationship. At least one of the corrugating members is rotated. The sheet of flexible nonwoven material is fed between the meshed portions of the ridges to form the sheet of flexible nonwoven material on the periphery of one of the corrugating members. This forms arcuate portions of the sheet of flexible nonwoven material in the spaces between the ridges of a first corrugating member and anchor portions of the sheet of flexible nonwoven material along the outer surfaces of the ridges of the first corrugating member. The formed sheet of flexible nonwoven material is retained along the periphery of the first corrugating member for a predetermined distance after movement past the meshing portions of the ridges. Following forming the arcuate nonwoven precursor material, an inelastic film is extruded in an extruding step which includes providing an extruder that, through a die with a die opening, extrudes a sheet of molten thermoplastic material onto the anchor portions of the sheet of flexible nonwoven material along the periphery of the first corrugating member within the above mentioned predetermined distance. The thus formed extrusion bonded composite is then oriented causing the sheet to undergo molecular orientation at least between the spaced apart bond sites. The degree of orientation is generally at least 1.25 to 1.0 in at least the longitudinal direction and can be from 4.0 to 1.0 in the longitudinal direction, preferably the extrusion bonded sheet is oriented in two or more directions by from 2.5 to 1.0, preferably 1.5 to 1.0.

Fibers suitable for forming the nonwoven fibrous layer nonwoven loop can be produced from a wide variety of thermoplastic polymers that are known to form fibers. Suitable thermoplastic polymers are selected from polyolefins, polyamides, polyesters, copolymers containing acrylic monomers, and blends and copolymers thereof. Suitable polyolefins include polyethylene, e.g., linear low density polyethylene, high density polyethylene, low density polyethylene and medium density polyethylene; polypropylene, e.g., isotactic polypropylene, syndiotactic polypropylene, blends thereof and blends of isotactic polypropylene and atactic polypropylene; and polybutylene, e.g., poly(1-butene) and poly(2-butene); polypentene, e.g., poly-4-methylpentene-1 and poly(2-pentene); as well as blends and copolymers thereof. Suitable polyamides include nylon 6, nylon 6/6, nylon 10, nylon 4/6, nylon 10/10, nylon 12, nylon 6/12, nylon 12/12, and hydrophilic polyamide copolymers such as copolymers of caprolactam and an alkylene oxide, e.g., ethylene oxide, and copolymers of hexamethylene adipamide and an alkylene oxide, as well as blends and copolymers thereof. Suitable polyesters include polyethylene terephthalate, polybutylene terephthalate, polycyclohexylenedimethylene terephthalate, and blends and copolymers thereof. Acrylic copolymers include ethylene acrylic acid, ethylene methacrylic acid, ethylene methylacrylate, ethylene ethylacrylate, ethylene butylacrylate and blends thereof. Particularly suitable polymers are polyolefins, including polyethylene, e.g., linear low density polyethylene, low density polyethylene, medium density polyethylene, high density polyethylene and blends thereof; polypropylene; polybutylene; and copolymers as well as blends thereof.

Preformed fibers can be formed into the nonwoven fibrous web by any suitable method such as carding, rando webbers, hydroentanging, and needlepunching. Alternatively, the nonwoven fibrous web can be directly formed from thermoplastic fiber forming polymers such as by spunbond or meltblown and like techniques that directly form nonwovens from a polymer melt. These nonwovens can be modified by blending in additional discrete fiber or particulates, coated or include suitable melt additives for the intended end use. Generally, the nonwoven fibrous web used to form the invention loop composite will be from 10 to 100 g/m$^2$, preferably 15 to 50 g/m$^2$ and comprise at least in part thermoplastic fibers suitable for bonding, such as at least 10 percent bondable thermoplastic fibers, in a specific embodiment from 20 to 100 percent bondable thermoplastic fibers.

FIG. 1 illustrates a precursor nonwoven loop fabric prior to orientation, generally designated by the reference numeral 10 which nonwoven laminate material 10 is oriented and then generally cut into pieces for use in a discrete closure system. Generally the nonwoven laminate material 10 has a backing 11 comprising a thermoplastic film with front and rear surfaces 13 and 14. The nonwoven web 16 has non-deformed anchor portions 17 autogenously bonded to the backing 11 forming bonding locations 18. The bonding locations 18 in FIG. 1 are along the front surface 13 with arcuate portions 20 of the nonwoven web 16 projecting from the front surface 13 of the backing layer 11 between the bonding locations 18. As shown in FIG. 1 the bonding locations can be continuous rows extending transversely across the nonwoven composite loop material 10. However the bonding locations can be arranged in any pattern including, for example, intermittent lines, hexagonal cells, diamond cells, square cells, random point bonds, patterned point bonds, crosshatched lines, or any other regular or irregular geometric pattern.

Figure 2:
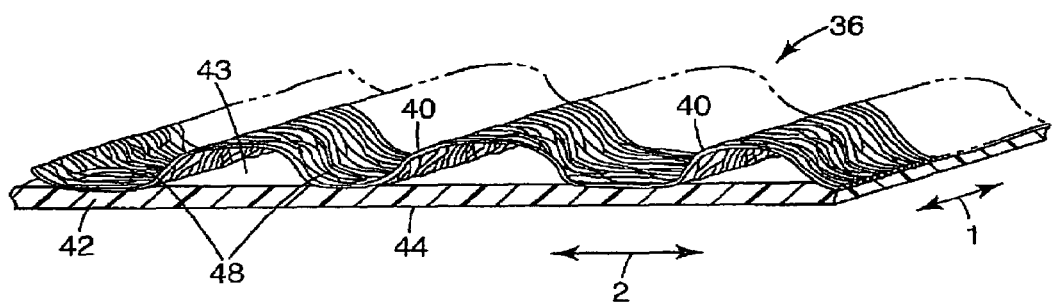
FIG. 2 is a schematic view of a first embodiment loop material prepared according to the invention using the precursor material of FIG. 1.

FIG. 2 illustrates the FIG. 1 loop composite following orientation. The loop composite 36 comprises an oriented thermoplastic film 42 with front and rear surfaces 43 and 44. The nonwoven web 40 has anchor portions 48 autogenously bonded to the backing layer 42. These anchor portions can be at least slightly deformed. The film between the bonding locations 48 is oriented in at least the longitudinal direction 2 and preferably also in the transverse direction 1. The degree of orientation is generally 4.0 to 1.0 or less.

Figure 3:
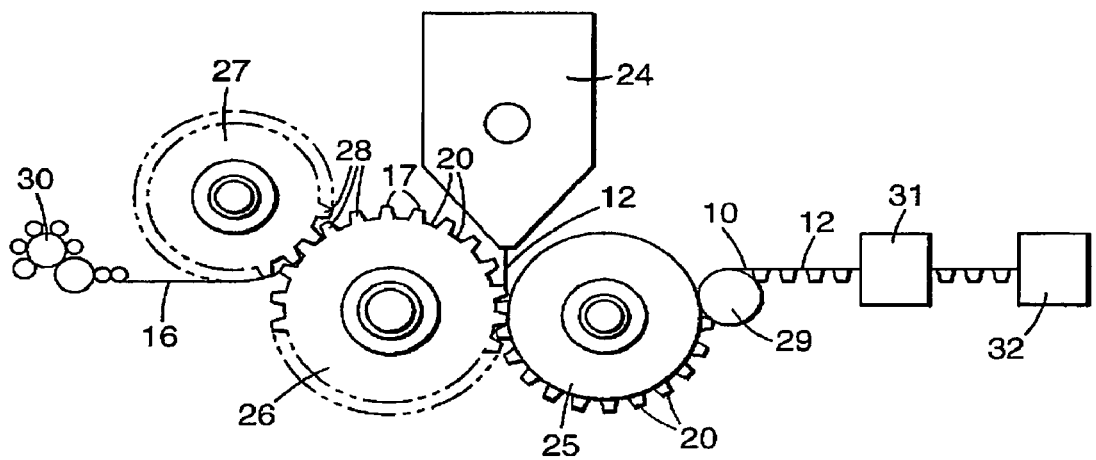
FIG. 3 is a schematic view illustrating a method of forming the loop material of the invention depicted in FIG. 1.

FIG. 3 schematically illustrates a method and equipment for forming the loop fabric 10 shown in FIG. 1. The method generally comprises providing first and second corrugating members or rollers, 26 and 27 each having an axis and including a plurality of circumferentially spaced generally axially extending ridges 28 around and defining its periphery, with spaces between the ridges 28 adapted to receive portions of the ridges 28 of the other corrugating member, 26 or 27, in meshing relationship with the nonwoven web 16 between the meshed ridges 28. The corrugating members 26 and 27 are mounted in axially parallel relationship with portions of the ridges 28 meshing generally in the manner of gear teeth; at least one of the corrugating members, 26 or 27, is rotated; and the nonwoven web 16 is fed between the meshed portions of the ridges 28 of the corrugating members 26 and 27 to generally corrugate the nonwoven web 16. The corrugated nonwoven web 16 is retained along the periphery of the first corrugating member 26 after it has moved past the meshed portions of the ridges 28. In the FIG. 3 method a thermoplastic backing layer 12 of a film is formed and bonded to the anchor portions 17 of the sheet of fibers 16 on the end surfaces of the ridges 28 on the first corrugating member 26 by extruding or coextruding the thermoplastic backing layer 12 in a molten state from a die 24 into a nip between the anchor portions 17 of the nonwoven 16 on the periphery of the first corrugating member 26 and a cooling roll 25. This embeds the fibers of the nonwoven web into the film backing layer. After cooling by the cooling roll 25 in the nip the sheet of loop material 10 is separated from the first corrugating member 26 and carried partially around the cooling roll 25 and through a nip between the cooling roller 25 and a pinch roller 29 to complete cooling and solidification of the backing layer 12. The loop composite is then oriented in the longitudinal and/or transverse direction by conventional devices 31 and 32 which can be sequential or simultaneous.

The nonwoven fibrous web can be formed from discrete fibers using, e.g., a carding machine 30, which nonwoven web of randomly oriented fibers 16 has enough integrity to be fed from the, carding machine 30 into the nip between the corrugating members 26 and 27 (if needed, a conveyer (not shown) could be provided to help support and guide the nonwoven web 16 between the carding machine 30 and the corrugating members 26 and 27). When such a nonwoven web 16 is used, preferably the first corrugating member 26 has a rough finish (e.g., formed by sand blasting), the second corrugating member 27 has a smooth polished finish, and the first corrugating member 26 is heated to a temperature slightly above the temperature of the second corrugating member 26 so that the nonwoven web 16 will preferentially stay along the surface of the first corrugating member 26 and be carried to the nip between the first corrugating member and the roller 25 after passing through the nip between the corrugating members 26 and 27. Alternatively, a vacuum could be used to help hold the nonwoven fibrous web 16 onto the structure of the first corrugating member 26.

Corrugating members 26 and 27, as shown in FIG. 3, adapted to have a nonwoven fibrous web 16 fed into them, can have ridges 28 oriented generally in the range of 0 to 45 degrees with respect to its axes, but preferably have its ridges 28 oriented at 0 degrees with respect to (or parallel to) its axes which simplifies making of the corrugating members 26 and 27.

The cooling roll 25 in the embodiments shown in FIG. 3 can be water cooled and have a chrome plated periphery. Alternatively, the cooling roll 25 may have an outer rubber layer defining its surface. If roll 25 is a heated roll this could be by means of an oil or water heated roll or an induction roll.

Preferably for an extrusion bonded or thermally bonded method using corrugating rolls 26 and 27 and a nip roll 25, the drives for the corrugating members 26 and 27 and for the roller 25 can be rotated at a surface speed that is the same as or different than, the surface speed of the first corrugating member 26. When the roller 25 and the first corrugating member 26 are rotated so that they have the same surface speed, the nonwoven 16 will have about the same shape along the backing 11 as it had along the periphery of the first corrugating member 26 as is illustrated in FIG. 3. When the roller 25 and the first corrugating member 26 are rotated so that the roller 25 has a surface speed that is slower than the surface speed of the first corrugating member 26, (e.g., one quarter or one half) the anchor portions 17 of the nonwoven 16 will be moved closer together in the backing layer 12 at the nip between the roller 25 and the first corrugating member 26, resulting in greater density of the arcuate portions 20 along the backing 11 than when the cooling roller 25 and the first corrugating member 26 are rotated so that they have the same surface speed.

Figure 4:
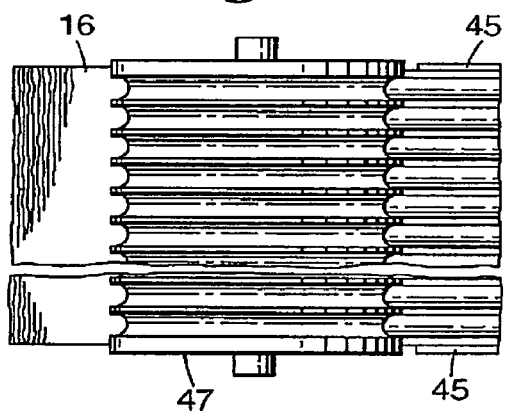
FIG. 4 is a top view of the corrugating members depicted in FIG. 3.
Figure 5:
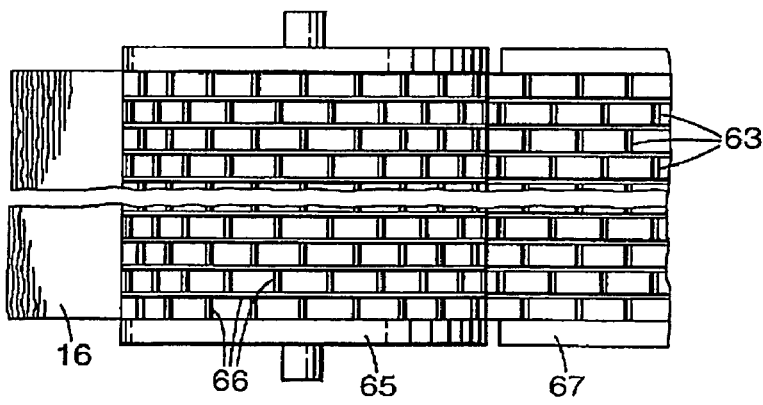
FIG. 5 is a top view of alternate corrugating members which could be substituted for the corrugating members illustrated in FIG. 4.

FIGS. 4 and 5 illustrate two different corrugating members. One or a pair of cylindrical heated corrugating members 47 and 45, and 65 and 67 could be substituted for the corrugating member 26 and 27 to form a nonwoven loop composite using generally the method described above with reference to FIG. 3. In FIG. 5 the corrugating member 65 and its mating corrugating member 67, if provided, each have an axis and includes a plurality of ridges 63 or 66. The ridges 63 or 66 on each corrugating member defining spaces between the ridges 63 or 66, which spaces can be adapted to receive a portion of the ridges of another corrugating member in meshing relationship in the manner of a pair of gears. If desired, the ridges on a first corrugating member could be arranged in any suitable pattern including forming words, numbers or symbols, for example, to form a trademark on the nonwoven loop composite.

The arcuate portions of the precursor nonwoven web between adjacent bonding locations provide the z-direction loft and have a generally uniform maximum height from the backing layer of less than about 10 mm and preferably 0.5 to 5.0 mm. The height of the arcuate portions of the nonwoven fibrous is at least one third, and preferably one half to one and one half times the distance between adjacent bonding locations. After orientation of the film backing, the arcuate portions have a generally uniform maximum height from the oriented backing layer of less than 3.0 mm, preferably from 0 to 1 mm and the distance between the bonded portions is from 4 mm to 1000 mm, preferably 5 mm to 500 mm. The arcuate portions generally comprise 20 to 99 percent of the cross-section of the entire loop composite preferably 50 to 95%.

The majority of the individual fibers forming the nonwoven fibrous web are preferably on average 1 to 70 µm in diameter. The nonwoven fibrous web material, without the backing, has a basis weight in the range of 10 to 100 g/m$^2$ (and preferably in the range of 15 to 50 g/m$^2$) measured along the first surface 13. The backing layer generally has a basis weight of from 15 to 150 g/m$^2$, preferably from 20 to 50 g/m$^2$. The total nonwoven loop composite 10 has a basis weight of from 30 to 300 g/m$^2$, preferably 40 to 100 g/m$^2$.

If the nonwoven is a nonwoven fibrous web material provided by carding Rando webs, airlaid webs, spun-lace webs, spun-bond webs, or the like, the nonwoven fibrous material is preferably not prebonded or consolidated to maximize the open area between the fibers. However, in order to allow preformed webs to be handled, it is necessary on occasion to provide suitable point bonding and the like which should be at a level only sufficient to provide integrity to unwind the preformed web from a roll and into the forming process for creating the invention nonwoven loop composite.

Generally, the nonbonded portions of the nonwoven fibrous web are from 99.5 to 50 percent providing bonded areas over from 50 to 0.5 percent of the surface area of the nonwoven fibrous web, preferably, the overall bonded area of the nonwoven is from 20 to 2 percent. The bonded areas include those areas of the sheet of fibers bonded to the backing layer as well as any prebonded or consolidated areas provided to improve web integrity. The specific bonding portions or areas bonded to the backing layer generally can be any width; however, preferably are from 0.01 to 0.2 centimeters in its narrowest width dimension. Adjacent bonding portions are generally on average spaced from 0.1 to 2.0 cm, and preferably 0.2 to 1.0 cm, apart. When the bonded portions are in the form of point bonds, the points are generally of substantially circular shape providing circular bonds preferably formed either by extrusion bonding or thermal bonding. Other shapes in the bonded and unbonded portions are possible, providing unbonded mounds or arcuate portions which are circular, triangular, hexagonal, or irregular in shape.

In order to maintain the desirable softness of the loop material, the backing layer or layers generally has a thickness from 10 to 300 microns, preferably from 20 to 100 microns providing a soft nonwoven fibrous loop material laminate having an overall circular bend stiffness (as measured by ASTM D4302) of less than 9N, preferably less than 7N, and most preferably from 6N to 1N. The loop composite has sufficient tensile strength in order to be reliably used in continuous manufacturing techniques requiring a dimensionally stable material, generally having a tensile strength of at least 0.5 kg/cm, preferably at least 1.0 kg/cm.

Alternatively, the nonwoven loop fabric with arcuate nonwoven structures can be bonded to a preformed film by conventional bonding methods such as thermal bonding, ultrasonic bonding and adhesive bonding. Such a process is described in EP 341 993 B1.

TEST METHODS

Basis Weight

The basis weights of the composite materials were measured by die cutting a 10 cm by 10 cm sample from a web of material and weighing the sample to the nearest tenth of a gram on a scale. Three replicates were weighed and averaged and are reported in Table 1 below.

Yield Tensile Strength

The tensile strengths of the nonwoven composites were measured according to ASTM D882 with an INSTRON Model 1122 constant rate of extension tensile machine. A sample was cut from the composite web, 25 mm wide by 76 mm long, the long direction being in the machine direction (MD) of the web. The sample was mounted in the jaws of the test machine with an initial jaw separation of 76 mm. The jaws were then separated at a rate of 30.5 cm/min until the break point of the sample was reached. The load at the yield point of the sample was recorded in pounds. Four replicates were tested and averaged together and converted to a load at yield value in kg/cm units.

135 Degree Peel Test

The 135 degree peel test was used to measure the amount of force that was required to peel a sample of a mechanical fastener hook material (KN-3457, 3M Co., St. Paul, Minn.) from a sample of the nonwoven loop composite. A 5.1 cm×12.7 cm piece of the loop test material was securely placed on a 5.1 cm×12.7 cm steel panel by using a double-coated adhesive tape. The loop material was placed onto the panel with the cross direction of the loop material parallel to the long dimension of the panel. A 1.9 cm×2.5 cm strip of the hook fastener was cut with the long dimension being in the machine direction of the web. A 2.5 cm wide by 20 cm long paper leader was attached to the smooth side of one end of the hook strip. The hook strip was then centrally placed on the loop material so that there was a 1.9 cm×2.5 cm contact area between the strip and the loop material and the leading edge of the strip was along the length of the panel. The strip and loop material laminate was then rolled by hand, twice in each direction, using a 1000 gram roller at a rate of approximately 30.5 cm per minute. The sample was then placed in a 135 degree peel jig. The jig was placed into the bottom jaw of an INSTRON Model 1122 tensile tester. The loose end of the paper leader was placed in the upper jaw of the tensile tester. A crosshead speed of 30.5 cm per minute and a chart recorder set at a chart speed of 50.8 cm per minute was used to record the peel force as the hook strip was peeled from the loop material at a constant angle of 135 degrees. An average of the four highest peaks was recorded in grams. The force required to remove the mechanical fastener strip from the loop material was reported in grams/cm-width. 12 replicates were run and averaged for each hook and loop combination. The peel strengths were normalized by dividing the peel strengths by the basis weight of the loop composite to arrive at a peel strength per unit weight of composite.

Dynamic Shear

The dynamic shear test was used to measure the amount of force required to shear a sample of mechanical fastener hook material from a sample of the nonwoven loop composite material. The same hook material as described above in the 135 degree peel test was used to perform the shear test. A 2.5 cm×7.5 cm sample of the loop material was cut with the short dimension being in the machine direction of the hook. This loop sample was then reinforced with 3M strapping tape on the backside of the loop. A 1.25 cm×2.5 cm hook sample was also prepared. The long dimension is the machine direction of the hook. This sample was laminated to the end of a tab of 3M strapping tape 2.5 cm wide×7.5 cm long. The strapping tape was doubled over on itself on the end without hook to cover the adhesive. The hook was then placed centrally on the loop with long tab directions parallel to each other such that the loop tab extended past on the first end and the hook tab extended past on the second end. The hook material was engaged with the loop material by rolling down by hand with a 5 kg rubber covered steel roller forwards and backwards five times. The assembled tabs were placed into the jaws of an Instron Model 1122 tensile tester. The hook tab placed in the top jaw, the loop tab placed in the bottom jaw. A crosshead speed of 30.5 cm per minute and a chart recorder set at a chart speed of 50.8 cm per minute was used to record the shear force as the hook strip was sheared from the loop material at a constant angle of 180 degrees. The maximum load was recorded in grams. The force required to shear the mechanical fastener strip from the loop material was reported in grams/cm-width. 8 replicates were run and averaged for each hook and loop combination. The shear strengths were normalized by dividing the shear strengths by the basis weight of the loop composite to arrive at a shear strength per unit weight of composite.

EXAMPLES

Comparative Example C1

A nonwoven loop composite was prepared using the method illustrated and described in U.S. Pat. No. 5,643,397 by feeding a polypropylene carded nonwoven web (T196, 4 denier fibers, 40 grams per square meter, Fiber Vision, Athens, Ga.) into the nip between a first and second intermeshing corrugating rollers which were machined with axially parallel ridges spaced such that there were approximately 4 ridges per centimeter with a groove between each ridge. Each ridge was machined to have a flat top-surface having a width of about 0.7 mm. The corrugated sheet of nonwoven was shaped such that there were arcuate portions and anchor portions along the length of the nonwoven, each arcuate portion being about 0.33 cm high and about 0.33 centimeter long along the length of the nonwoven, and each anchor portion being about 0.07 centimeter wide. The first corrugating roller was heated to 93° C., whereas the second corrugating roller was heated to 149° C. A polypropylene impact copolymer (7C50, Dow Chemical, Midland, Mich.) was extruded through a conventional coat hanger die at a die temperature of 246 degrees C. and onto the anchor portions of the corrugated nonwoven just prior to the nip between the second corrugating roll and a cooling roll in an amount appropriate to form a thermoplastic backing layer having a basis weight of 28 grams per square meter with the anchor portions of the formed sheet of fibers embedded in the backing layer.

Example 1

The nonwoven loop composite C1 was biaxially oriented using a KARO IV pantograph stretcher (Bruckner Gmbh, Siegfred, Germany). A 115 mm by 115 mm sample was cut from the web of the composite and mounted in the stretcher. The sample was heated for 60 seconds at 140° C. and then stretched at a rate of 100%/sec to a final dimension of approximately 150 mm by 150 mm resulting in a biaxial orientation of 1.5 to 1 in both the machine and cross directions of the sample. The sample was removed from the stretcher and tested for tensile strength and peel and shear properties.

Comparative Example C2

A nonwoven loop composite was prepared as in C1 except the basis weight of the input fiber web was 28 grams per square meter, and the basis weight of the extrudate was 30 grams per square meter.

Example 2

The nonwoven loop composite C2 was oriented in the cross direction using a KARO IV pantograph stretcher. A 115 mm by 115 mm sample was cut from the web of the composite and mounted in the stretcher. The sample was heated for 60 seconds at 140° C. and then stretched in the cross direction at a rate of 100%/sec to a final dimension of approximately 100 mm by 250 mm resulting in a cross direction orientation of 2.5 to 1. The sample was removed from the stretcher and tested for tensile strength and peel and shear properties.

Example 3

The nonwoven loop composite C2 was oriented in the machine direction using a KARO IV pantograph stretcher. A 115 mm by 115 mm sample was cut from the web of the composite and mounted in the stretcher. The sample was heated for 60 seconds at 140° C. and then stretched in the machine direction at a rate of 100%/sec to a final dimension of approximately 250 mm by 100 mm resulting in a machine direction orientation of 2.5 to 1. The sample was removed from the stretcher and tested for tensile strength and peel and shear properties.

Example 4

The nonwoven loop composite C2 was biaxially oriented using a KARO IV pantograph stretcher. A 115 mm by 115 mm sample was cut from the web of the composite and mounted in the stretcher. The sample was heated for 60 seconds at 140° C. and then stretched at a rate of 100%/sec to a final dimension of approximately 150 mm by 150 mm resulting in a biaxial orientation of 1.5 to 1 in both the machine and cross directions of the sample. The sample was removed from the stretcher and tested for tensile strength and peel and shear properties.

Comparative Example C3

A nonwoven loop composite was prepared as in C1 except the basis weight of the input fiber web was 22 grams per square meter, and the basis weight of the extrudate was 30 grams per square meter.

Example 5

The nonwoven loop composite C3 was oriented in the cross direction using a KARO IV pantograph stretcher. A 115 mm by 115 mm sample was cut from the web of the composite and mounted in the stretcher. The sample was heated for 60 seconds at 140° C. and then stretched in the cross direction at a rate of 100%/sec to a final dimension of approximately 100 mm by 250 mm resulting in a cross direction orientation of 2.5 to 1. The sample was removed from the stretcher and tested for tensile strength and peel and shear properties.

Example 6

The nonwoven loop composite C3 was oriented in the machine direction using a KARO IV pantograph stretcher. A 115 mm by 115 mm sample was cut from the web of the composite and mounted in the stretcher. The sample was heated for 60 seconds at 140° C. and then stretched in the machine direction at a rate of 100%/sec to a final dimension of approximately 250 mm by 100 mm resulting in a machine direction orientation of 2.5 to 1. The sample was removed from the stretcher and tested for tensile strength and peel and shear properties.

Example 7

The nonwoven loop composite C3 was biaxially oriented using a KARO IV pantograph stretcher. A 115 mm by 115 mm sample was cut from the web of the composite and mounted in the stretcher. The sample was heated for 60 seconds at 140° C. and then stretched at a rate of 100%/sec to a final dimension of approximately 150 mm by 150 mm resulting in a biaxial orientation of 1.5 to 1 in both the machine and cross directions of the sample. The sample was removed from the stretcher and tested for tensile strength and peel and shear properties.

Comparative Example C4

A nonwoven loop composite was prepared as in C1 except the basis weight of the input fiber web was 17 grams per square meter, and the basis weight of the extrudate was 30 grams per square meter.

mm sample was cut from the web of the composite and mounted in the stretcher. The sample was heated for 60 seconds at 140° C. and then stretched at a rate of 100%/sec to a final dimension of approximately 150 mm by 150 mm resulting in a biaxial orientation of 1.5 to 1 in both the machine and cross directions of the sample. The sample was removed from the stretcher and tested for tensile strength and peel and shear properties.

TABLE 1

| Example | Orientation | Composite Basis Weight (gm/m²) | MD Yield Tensile Strength (kg/cm) | 135° Peel Strength (gm/cm) | Normalized Peel Strength (g/cm/g/m²) | Shear Strength (gm/cm) | Normalized Shear Strength (g/cm/g/m²) |
|---|---|---|---|---|---|---|---|
| C1 | 0 | 63 | 1.61 | 84.1 | 1.3 | 1375 | 21.8 |
| 1 | 1.5 Biax | 40 | 1.52 | 86.2 | 2.2 | 1307 | 32.7 |
| C2 | 0 | 64 | 1.64 | 98.3 | 1.5 | 1758 | 27.5 |
| 2 | 2.5 CD | 37 | 0.73 | 33.9 | 0.9 | 1139 | 30.8 |
| 3 | 2.5 MD | 33 | 2.43 | 46.5 | 1.4 | 552 | 16.7 |
| 4 | 1.5 Biax | 37 | 1.51 | 90.0 | 2.4 | 1563 | 42.3 |
| C3 | 0 | 57 | 1.40 | 57.4 | 1.0 | 1055 | 18.5 |
| 5 | 2.5 CD | 32 | 0.68 | 24.4 | 0.8 | 728 | 22.7 |
| 6 | 2.5 MD | 31 | 2.16 | 22.4 | 0.7 | 533 | 17.2 |
| 7 | 1.5 Biax | 35 | 1.22 | 66.7 | 1.9 | 1251 | 35.8 |
| C4 | 0 | 50 | 1.32 | 41.7 | 0.8 | 1321 | 26.4 |
| 8 | 2.5 CD | 30 | 0.75 | 20.5 | 0.7 | 748 | 24.9 |
| 9 | 2.5 MD | 27 | 1.97 | 21.7 | 0.8 | 471 | 17.4 |
| 10 | 1.5 Biax | 32 | 1.28 | 55.3 | 1.7 | 1270 | 39.7 |

Example 8

The nonwoven loop composite C4 was oriented in the cross direction using a KARO IV pantograph stretcher. A 115 mm by 115 mm sample was cut from the web of the composite and mounted in the stretcher. The sample was heated for 60 seconds at 140° C. and then stretched in the cross direction at a rate of 100%/sec to a final dimension of approximately 100 mm by 250 mm resulting in a cross direction orientation of 2.5 to 1. The sample was removed from the stretcher and tested for tensile strength and peel and shear properties.

Example 9

The nonwoven loop composite C4 was oriented in the machine direction using a KARO IV pantograph stretcher. A 115 mm by 115 mm sample was cut from the web of the composite and mounted in the stretcher. The sample was heated for 60 seconds at 140° C. and then stretched in the machine direction at a rate of 100%/sec to a final dimension of approximately 250 mm by 100 mm resulting in a machine direction orientation of 2.5 to 1. The sample was removed from the stretcher and tested for tensile strength and peel and shear properties.

Example 10

The nonwoven loop composite C4 was biaxially oriented using a KARO IV pantograph stretcher. A 115 mm by 115

This Table shows that when the samples were oriented in either the cross direction or the machine direction, generally the normalized peel and/or shear performance remained at or near that of the unoriented loops. However, when the loops of the Comparative Examples were biaxially oriented, the normalized peel and shear performance increased significantly despite the significantly lower basis weight of the composite loop. This was unexpected.

We claim:

1. A loop composite comprising:
   a nonwoven loop layer formed from a nonwoven web comprised of fibers formed from thermoplastic polymers, copolymers or blends; and
   an oriented film layer bonded to the nonwoven loop layer where the composite has bonded regions and unbonded regions and the film is oriented at least between the bonded regions, the unbonded regions forming arcuate mounds wherein the nonwoven web is autogenously bonded to the film layer by some of the fibers of the nonwoven web being encapsulated within the film layer at the bonded regions.

2. The loop composite of claim 1 wherein the nonwoven loop layer has a basis weight of from 10 to 100 grams/m².

3. The loop composite of claim 2 wherein the nonwoven loop layer has a z-direction height from the backing of at least 0.1 mm, and the region of the loop composite having arcuate mounds comprises 20 to 99 percent of the loop composite cross section.

4. The loop composite of claim 2 wherein the unwoven loop layer is formed of at least 10 percent bondable thermoplastic fibers by weight.

5. The loop composite of claim 2 wherein the nonwoven loop layer is formed of at least 20 percent bondable thermoplastic fibers by weight.

6. The loop composite of claim 1 wherein the oriented film layer is oriented in one direction.

7. The loop composite of claim 1 wherein the oriented film layer is oriented in two directions.

8. The loop composite of claim 1 wherein the oriented film layer is an inelastic thermoplastic layer that has a tensile strength in at least one direction of from 0.5 kg/cm to 3.0 kg/cm.

9. The loop composite of claim 8 wherein the oriented film layer is an inelastic thermoplastic layer that has a tensile strength in at least one direction of from 1.0 kg/cm to 2.5 kg/cm.

10. The loop composite. of claim 1 wherein the oriented film layer has a basis weight of from 10 g/m$^2$ to 100 g/m$^2$.

11. The loop composite of claim 1 wherein the oriented film layer has a basis weight of front 15 to 50 g/m$^2$.

12. The loop composite of claim 1 wherein the nonwoven loop layer has a basis weight of from 15 to 50 g/m$^2$.

13. The loop composite of claim 1 wherein the fibers forming the nonwoven loop layer are predominantly 1 to 50 μm in diameter.

14. The loop composite of claim 2 wherein the composite has a basis weight of from 30 to 300 g/m$^2$.

15. The loop composite of claim 2 wherein the composite has a basis weight of from 40 to 100 g/m$^2$.

16. The loop composite of claim 1 wherein the arcuate mounds are regular in shape.

17. The loop composite of claim 1 wherein the mounds are irregular in shape.

18. The loop composite of claim 2 wherein the arcuate mounds comprise from 50 to 95 percent of the cross sectional area of the composite.

19. The loop composite of claim 1 wherein 99.5 to 50 percent of the surface area of the nonwoven fibrous layer in the composite is unbonded.

20. The loop composite of claim 2 wherein the z-direction height is from (0.1 mm to 3.0 mm.

21. The loop composite of claim 1 wherein nonwoven layer is a carded fiber nonwoven web.

22. The loop composite of claim 1 wherein the fibers forming the nonwoven layer are from 1 to 70 μm in diameter.

23. The loop composite of claim 22 wherein the fibers forming the nonwoven layer are from 40 to 70 μm in diameter.

24. A method of forming a loop composite (1) providing a first sheet of flexible nonwoven material (e.g., nonwoven web of natural and/or polymeric fibers, and/or yarns); (2) forming the sheet of flexible nonwoven material to have arcuate portions projecting in the same direction from spaced anchor portions of the first sheet of flexible nonwoven material; (3) extruding a sheet of thermoplastic material that is inelastic (e.g., polyesters, polyolefins, nylons, polystrenes) onto the first sheet of flexible loop material; (4) providing the sheet of thermoplastic material while still molten to at least the spaced anchor portions of the first sheet of flexible nonwoven material to bond the extruded thermoplastic sheet to the nonwoven material at bond sites at the anchor portions; and (5) orienting the extrusion bonded nonwoven fabric sheet composite in at least the longitudinal direction of the sheet thereby orienting the sheet and reducing the height of arcuate portions of the nonwoven.

25. A loop composite formed by the process of (1) providing a first sheet of flexible nonwoven material (e.g., nonwoven web of natural and/or polymeric fibers, and/or yarns); (2) forming the first sheet of flexible nonwoven material to have arcuate portions projecting in the same direction from spaced anchor portions of the first sheet of flexible nonwoven material; (3) extruding a sheet of inelastic thermoplastic material onto the first sheet of flexible loop material; (4) providing the sheet of thermoplastic material, while still molten, to at least the spaced anchor portions of the first sheet of flexible nonwoven material to autogenously bond the extruded thermoplastic sheet to the nonwoven material at bond sites at the anchor portions by encapsulating at least some of the fibers of the flexible nonwoven material into the extruded thermoplastic sheet at the bond sites; and (5) orienting the extrusion bonded nonwoven fabric sheet composite in, at least the longitudinal direction of the sheet, thereby orienting the sheet and reducing the height of the arcuate portions of the flexible nonwoven material.

* * * * *

UNITED STATES PATENT AND TRADEMARK OFFICE
CERTIFICATE OF CORRECTION

PATENT NO. : 7,303,805 B2  
APPLICATION NO. : 10/744265  
DATED : December 4, 2007  
INVENTOR(S) : Jayshree Seth Page 1 of 1

It is certified that error appears in the above-identified patent and that said Letters Patent is hereby corrected as shown below:

Column 2  
Line 20, delete "yams);" and insert -- yarns); -- in place thereof.

Column 4  
Line 19, delete "hydroentanging," and insert -- hydroentangling, -- in place thereof.

Column 8  
Line 17, delete "upperjaw" and insert -- upper jaw -- in place thereof.

Column 9  
Line 38, delete "Siegfred," and insert -- Siegfried, -- in place thereof.

Column 13  
Line 1, Claim 4, delete "unwoven" and insert -- nonwoven -- in place thereof.  
Line 19, Claim 10, delete "composite." and insert -- composite -- in place thereof.  
Line 22, Claim 11, delete "front" and insert -- from -- in place thereof.  
Line 43, Claim 20, delete "(0.1" and insert -- 0.1 -- in place thereof.

Column 14  
Line 14, Claim 24, delete "polystrenes)" and insert -- polystyrenes) -- in place thereof.

Signed and Sealed this

Twentieth Day of January, 2009

JON W. DUDAS  
*Director of the United States Patent and Trademark Office*